United States Patent
Wernz et al.

(10) Patent No.: US 8,349,244 B2
(45) Date of Patent: Jan. 8, 2013

(54) ACTUATOR MOUNT SYSTEM AND METHOD OF MOUNTING AN ACTUATOR

(75) Inventors: Gunter Wernz, Laudenbach (DE); Christian Gotz, Bensheim (DE)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

(21) Appl. No.: 13/460,987

(22) Filed: May 1, 2012

(65) Prior Publication Data

US 2012/0231108 A1 Sep. 13, 2012

Related U.S. Application Data

(63) Continuation of application No. PCT/US2011/029721, filed on Mar. 24, 2011.

(60) Provisional application No. 61/317,522, filed on Mar. 25, 2010.

(51) Int. Cl.
*B29C 45/23* (2006.01)

(52) U.S. Cl. .............. 264/328.8; 264/328.9; 425/572; 425/588

(58) Field of Classification Search .............. 425/572, 425/588; 264/328.8, 328.9
See application file for complete search history.

(56) References Cited

U.S. PATENT DOCUMENTS

| | | | |
|---|---|---|---|
| 4,609,138 A * | 9/1986 | Harrison | 228/161 |
| 4,923,387 A * | 5/1990 | Gellert | 425/549 |
| 5,094,603 A * | 3/1992 | Gellert | 425/130 |
| 5,334,010 A * | 8/1994 | Teng | 425/563 |
| 6,436,320 B1* | 8/2002 | Kazmer et al. | 264/40.1 |
| 6,514,440 B1* | 2/2003 | Kazmer et al. | 264/39 |
| 6,599,116 B2* | 7/2003 | Lee et al. | 425/564 |
| 6,767,486 B2* | 7/2004 | Doughty et al. | 264/40.1 |
| 7,467,941 B2* | 12/2008 | Jenko | 425/564 |
| 7,708,551 B2* | 5/2010 | Jenko et al. | 425/549 |
| 7,731,489 B2* | 6/2010 | Fairy | 425/130 |
| 7,753,676 B2* | 7/2010 | Babin et al. | 425/564 |
| 7,901,601 B2* | 3/2011 | Vasapoli et al. | 264/40.1 |
| 7,931,455 B2* | 4/2011 | Tabassi | 425/3 |
| 8,016,581 B2* | 9/2011 | Vasapoli et al. | 425/145 |

* cited by examiner

*Primary Examiner* — Tim Heitbrink
(74) *Attorney, Agent, or Firm* — Rissman Hendricks & Oliverio LLP

(57) ABSTRACT

In an injection molding apparatus comprising a clamp plate, a heated manifold and a mold, a system for mounting an actuator to the manifold and the clamp plate, the system comprising: a mount comprised of a thermally conductive material having first and second heat conductive surfaces; the first conductive surface being in heat conductive communication with the actuator, the second conductive surface being in heat conductive communication with the clamp plate; the actuator being mounted in thermal communication with the manifold; the mount being adjustably mounted to the actuator such that the second conductive surface can be adjusted in position toward and away from the actuator.

22 Claims, 10 Drawing Sheets

ACTUATOR MOUNT SYSTEM AND METHOD OF MOUNTING AN ACTUATOR

RELATED APPLICATIONS

This application is a continuation of and claims the benefit of priority of and to PCT/US2011/029721 filed Mar. 24, 2011 which claims priority to U.S. Provisional Application Ser. No. 61/317,522 filed March 2010.

FIELD OF THE INVENTION

The present invention relates to injection molding equipment generally and more particularly to assemblies for mounting an actuator to a manifold.

BACKGROUND OF THE INVENTION

Heated hotrunners, manifolds, nozzles, nozzle tips and gate areas that are used in injection molding systems serve to receive and route molten material, typically polymer or plastic, under conditions of high pressure and high temperature. A natural consequence of the use of such high temperatures under which the molten material is injected into the manifold or distribution system is that operating components of the system such as an actuator that are incidentally in thermal communication with or disposed in close proximity to such heated components are themselves subjected to such high temperatures.

SUMMARY OF THE INVENTION

In accordance with the invention there is provided in an injection molding apparatus comprising a clamp plate, a heated manifold and a mold, a system for mounting an actuator to the manifold and the clamp plate, the system comprising:
  a mount comprised of a thermally conductive material having first and second opposing surfaces disposed between the heated manifold and the actuator, the actuator being mounted to the mount in thermal communication with the first opposing surface, the manifold being mounted in thermal communication with the second opposing surface of the mount;
  the mount having one or more third thermally conductive surfaces in thermal communication with the clamp plate.

The clamp plate, manifold and mold are typically assembled together with the actuator and the mount in an assembled operating arrangement such that the third thermally conductive surfaces of the mount are in compressed contact with the clamp plate under a spring force.

The spring force in such an embodiment is created by a deformation of a portion of the mount.

The manifold is typically heated to an elevated temperature from between about 300 degrees and about 800 degrees F., typically to between about 400 and about 600 degrees F. The clamping plate is typically cooled to a temperature significantly less than about 300 degrees F. and typically to less than about 150 degrees F.

The system preferably includes a thermally conductive cooling device having first and second mounting surfaces disposed between the second mounting surface of the mount and the heated manifold, the mount being mounted in thermally conductive communication with the first mounting surface of the cooling device and the manifold being mounted in thermally conductive communication with the second mounting surface of the cooling device. The cooling device typically comprises a thermally conductive metal device that is cooled to a temperature significantly less than about 300 degrees, typically to less than about 150 degrees F., preferably to less than about 100 degrees F.

The actuator or a body surface thereof is typically mounted in thermally conductive contact engagement with the first opposing surface of the mount. The clamp plate or a body surface thereof is typically mounted in thermally conductive contact or engagement with the one or more third thermally conductive surfaces of the mount. The cooling device or a body surface thereof is typically mounted in thermally conductive contact or engagement with the second opposing surface of the mount.

The mount typically comprises a plate having a primary mounting surface that receives and engages a body surface of the actuator. The plate typically has projections that are arranged and configured to extend beyond the engaged body surface of the actuator such that the projections of the plate are formed into the third surfaces of the plate that laterally extend into thermally conductive contact engagement with one or more body surfaces of the clamp plate. The engaged surfaces of the clamp plate and the mount cause the actuator to be cooled by conduction of heat from the actuator to the clamp plate through the thermally conductive mount. Similarly, the engaged surfaces of the cooling device and the mount further enable the mount to be cooled thus also serving to cool the actuator via conduction of heat from the actuator to the cooling device through the mount.

In such an embodiment, the projections of the mount include a spring, the clamp plate, the mold, the manifold, the actuator and the mount being assembled together in an arrangement wherein the spring is loaded urging the third surfaces into compressed engagement with the clamp plate.

The clamp plate is preferably mounted in a position upstream from and in spaced thermal isolation from the manifold. The clamp plate is most preferably cooled.

The actuator is connected to a valve pin that extends through a fluid material feed bore in the manifold. The valve pin preferably extends from the actuator and is mounted to the manifold.

In another aspect of the invention there is provided in an injection molding apparatus having a clamp plate and a heated manifold, a system for mounting an actuator to the manifold and the clamp plate, the system comprising:
  a mount comprised of a thermally conductive material having first and second opposing surfaces disposed between the heated manifold and the actuator, the actuator being mounted in thermally conductive contact with the first opposing surface and the manifold being in mounted in thermal communication with the second opposing surface of the mount;
  wherein the clamp plate is cooled to a substantially lower temperature than the heated manifold of at least about 100 degrees F.;
  the mount having one or more extensions in thermally conductive contact with the cooled clamp plate.

In such an embodiment, the mount includes a spring, the clamp plate, the mold, the manifold, the actuator and the mount being assembled together in an arrangement wherein the spring is loaded urging the extensions into compressed engagement with the clamp plate.

In another aspect of the invention there is provided in an injection molding apparatus having a clamp plate and a heated manifold, a system for mounting an actuator to the manifold and the clamp plate, the system comprising:

a mount comprised of a thermally conductive material having first and second heat conductive surfaces disposed between the clamp plate and the actuator, the actuator being mounted in thermal communication with the first conductive surface and the clamp plate being in mounted in thermal communication with the second conductive surface;

the actuator being mounted to the manifold;

the second conductive surface of the mount being urged into contact with the clamp plate under a spring force exerted between the actuator and the mount.

In such an embodiment, the apparatus preferably comprises a cooling device disposed between the actuator and the manifold and separating the actuator from direct contact with the manifold, the cooling device having a first mounting surface in thermally conductive communication with a mounting surface of the actuator and a second mounting surface in thermally conductive communication with a mounting surface of the manifold. The cooling device typically comprises a thermally conductive metal device that is cooled to a temperature significantly less than about 300 degrees, typically to less than about 150 degrees F., preferably to less than about 100 degrees F.

In such an embodiment, the first conductive surface of the mount is adapted to be slidably engaged with an outside surface of the actuator, the second conductive surface of the mount being adjustable in distance toward and away from the actuator by sliding movement of the first conductive surface on the outside surface of the actuator.

The first conductive surface of the mount is preferably maintained or secured in compressed contact with the outside surface of the actuator.

The clamp plate is preferably mounted in a position upstream from and in spaced thermal isolation from the manifold. The clamp plate is most preferably cooled.

In such an embodiment the mount can include a spring disposed between a body surface of the actuator and the mount, the clamp plate, the mold, the manifold, the actuator and the mount being assembled together in an arrangement wherein the spring is compressed urging the second conductive surface of the mount into compressed engagement with the clamp plate.

In such an embodiment, the actuator is connected to a valve pin that extends through a fluid material feed bore in the manifold. The valve pin preferably extends from the actuator and is mounted to the manifold.

In another aspect of the invention there is provided in an injection molding apparatus having a clamp plate and a heated manifold, a system for mounting an actuator to the manifold and the clamp plate, the system comprising:

a mount comprised of a thermally conductive material having first and second heat conductive surfaces disposed between the clamp plate and the actuator, the actuator being mounted in thermal communication with the first conductive surface and the clamp plate being in mounted in thermal communication with the second conductive surface;

the mount being adjustably mounted to the actuator such that the second conductive surface can be adjusted in position relative to the actuator for selectively engaging and disengaging from thermally conductive contact with the clamp plate.

In such an embodiment the mount can include a spring disposed between a body surface of the actuator and the mount, the clamp plate, the mold, the manifold, the actuator and the mount being assembled together in an arrangement wherein the spring is compressed urging the second conductive surface of the mount into compressed engagement with the clamp plate.

In such an embodiment, the clamp plate is adapted to be mounted to the mold and the actuator is adapted to be mounted to the manifold in an arrangement such that a spring is compressed to exert the spring force on assembly and mounting of the clamp plate to the mold.

In another aspect of the invention there is provided in an injection molding apparatus comprising a clamp plate, a heated manifold and a mold, a system for mounting an actuator to the manifold and the clamp plate, the system comprising:

a mount comprised of a thermally conductive material having first and second heat conductive surfaces disposed between the clamp plate and the actuator, the clamp plate being mounted in substantial thermal isolation from the manifold;

the actuator being mounted to the manifold;

the first conductive surface of the mount being mounted in sliding conductive contact with a surface of the actuator, the second conductive surface of the mount being urged into contact with the clamp plate under a spring force exerted between the actuator and the mount, the first conductive surface of the mount being slidable against the surface of the actuator under the spring force while the second conductive surface of the mount is urged into contact with the clamp plate by the spring force.

In such an embodiment the actuator is mounted in thermally conductive communication with the heated manifold.

In such an embodiment, the clamp plate is adapted to be mounted to the mold and the actuator is adapted to be mounted to the manifold in an arrangement such that a spring is compressed to exert the spring force on assembly and mounting of the the clamp plate to the mold.

In another aspect of the invention there is provided a method of mounting an actuator that drives a valve pin in an injection molding system comprising a manifold, a mold and a clamp plate, the method comprising:

mounting the clamp plate to the mold in thermal isolation from the manifold;

cooling the clamp plate;

mounting the actuator in thermal communication with the manifold;

heating the manifold;

forming a heat transfer mount having a spring, a first conductive surface and a second conductive surface;

assembling the clamp plate, the manifold, the actuator and the mold together such that the first conductive surface of the heat conductive mount is disposed in contact with a heat conductive surface of the actuator, the second conductive surface of the heat conductive mount is disposed in heat conductive contact with the clamp plate and the spring is compressed to urge the second conductive surface of the mount into thermally conductive contact with the clamp plate.

Typically the method further comprises mounting the heat transfer mount to the heat conductive surface of the actuator such that the first conductive surface of the heat transfer mount is maintained in sliding heat conductive contact with the heat conductive surface of the actuator.

The method preferably further comprises disposing a cooled plate between the actuator and the manifold in thermally conductive communication therewith.

The method can further comprise driving the valve pin through a fluid feed bore within the manifold.

DETAILED DESCRIPTION

Figure 1:
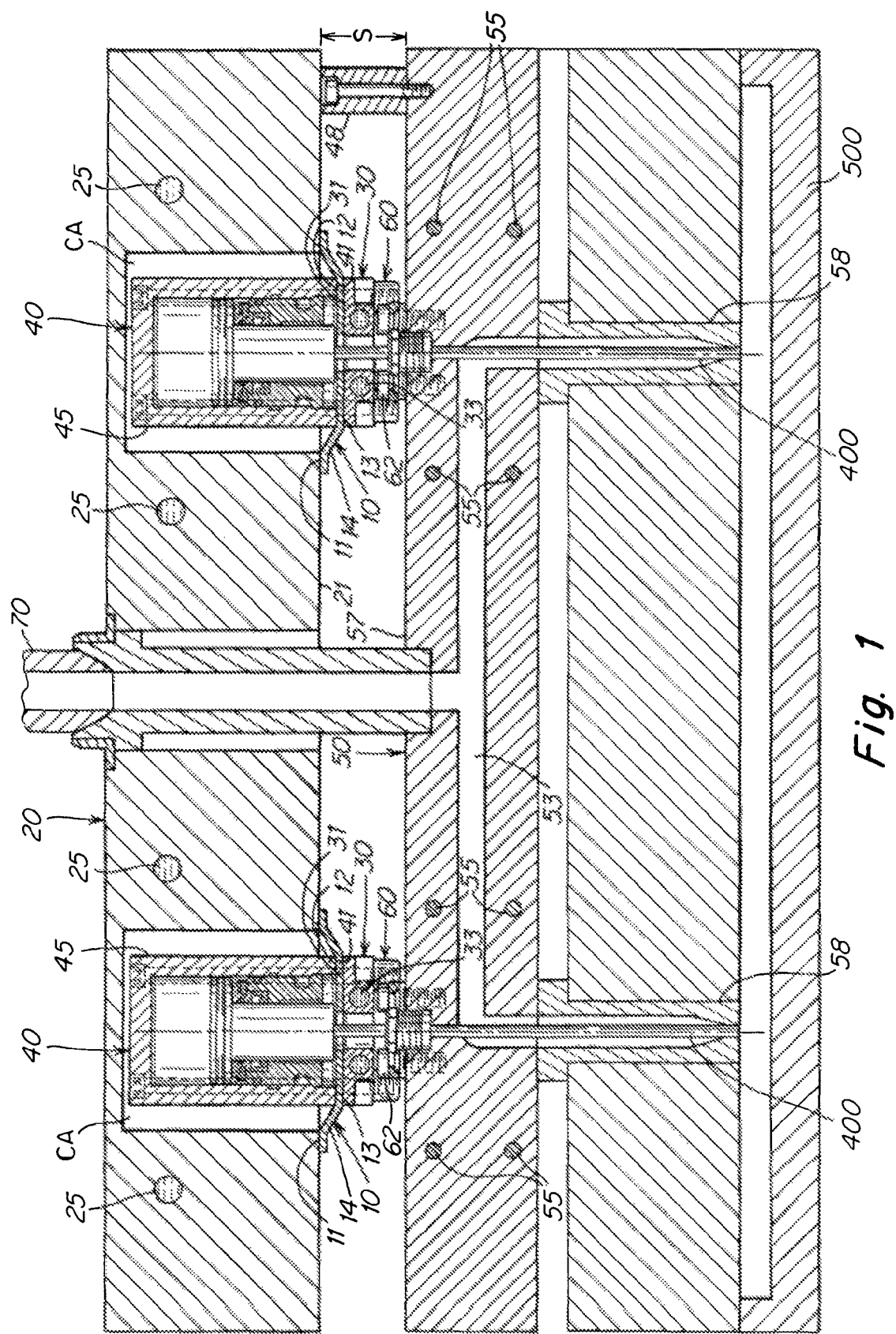
FIG. 1 is a schematic cross-sectional view of a hotrunner system incorporating an apparatus according to the invention.

FIGS. 1-9 show an actuator 40 comprised of a thermally conductive metal housing 45 having a bottom surface 41 mounted in compressed engagement/contact with a top surface 12 of a highly thermally conductive plate 10. The actuator 40 is surrounded by and/or mounted within a complementary receiving recess CA of large thermally conductive metal clamp plate 20 which is proactively cooled with water pumped through cooling channels 25 during operation of the injection molding apparatus. The apparatus generally is comprised of an injection molding machine 70, FIG. 1, which injects fluid material into the flow channels 53 of a hotrunner or manifold 50 which is heated to an elevated temperature by heaters 55. The hotrunner 50 is mounted between a cooled upstream clamping plate or clamp plate 20 and a downstream mold 500. The fluid material is routed from the runners 53 of the hotrunner 50 into the cavity of a mold 500, the mold typically being cooled in the same manner as the clamp plate 20 is cooled.

As shown in all of the embodiments of FIGS. 1-11, the actuator 40 is mounted to the manifold 50, separated from direct contact with the manifold 50 in the FIGS. 1-9 embodiments by both the mounting plate 10, a cooling device 30 and mount 60 for the cooling device. In the FIGS. 10, 11 embodiment, the actuator is separated from direct contact with the manifold by the cooling device 30 and the mount 60 for the cooling device.

In the FIGS. 1-9 embodiments, a bottom surface 41 of the body 45 of the actuator 40 is mounted in thermally conductive contact with a top surface 12 of the highly thermally conductive cooling or mounting plate 10. The bottom or downstream surface 13 of the cooling or mount plate 10 is in turn mounted in compressed contact with the top or upstream facing surface 31 of highly thermally conductive metal cooling block 30. The cooling block 30 is proactively cooled with water pumped through cooling channels 33 during active operation of the entire apparatus. As shown the cooling block is mounted on a mount 60 the bottom surfaces 63 of which are mounted in direct contact with the top surface 57 of the heated hotrunner 50. During operation of the apparatus, the cooled cooling block 30 serves to maintain the actuator 40 cool and/or relatively insulated from the heated manifold 50. In the embodiment shown in the Figures, the cooling block 30 is mounted on the intermediate mount 60 which itself is mounted in engagement contact with the body or top surface 57 of the heated manifold 50 via bolts 62. Heat from the heated manifold 50 is thus thermally conducted or transferred through the bolts 62 and through the mount 60, block 30 and mount 10 to the actuator 40.

Figure 2:
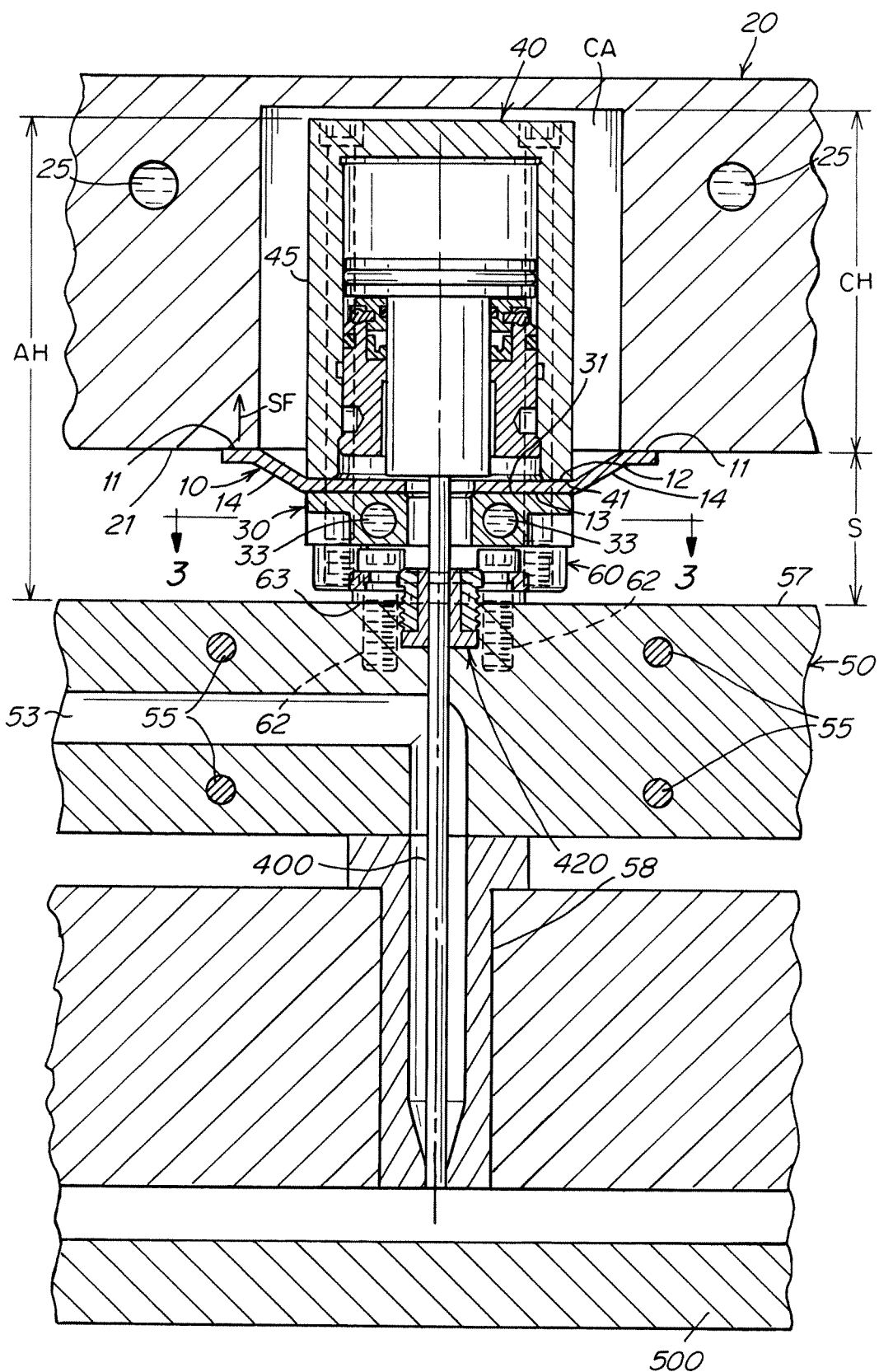
FIG. 2 is an enlarged detail view of a portion of FIG. 1.
Figure 3:
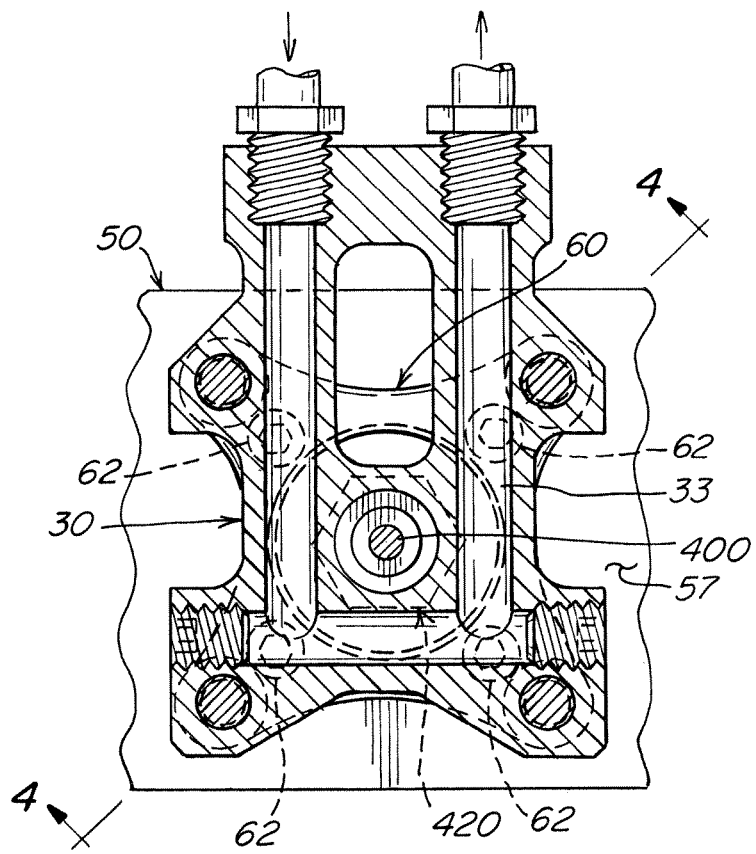
FIG. 3 is a cross-sectional plan view taken along line 3-3 of FIG. 2.
Figure 4:
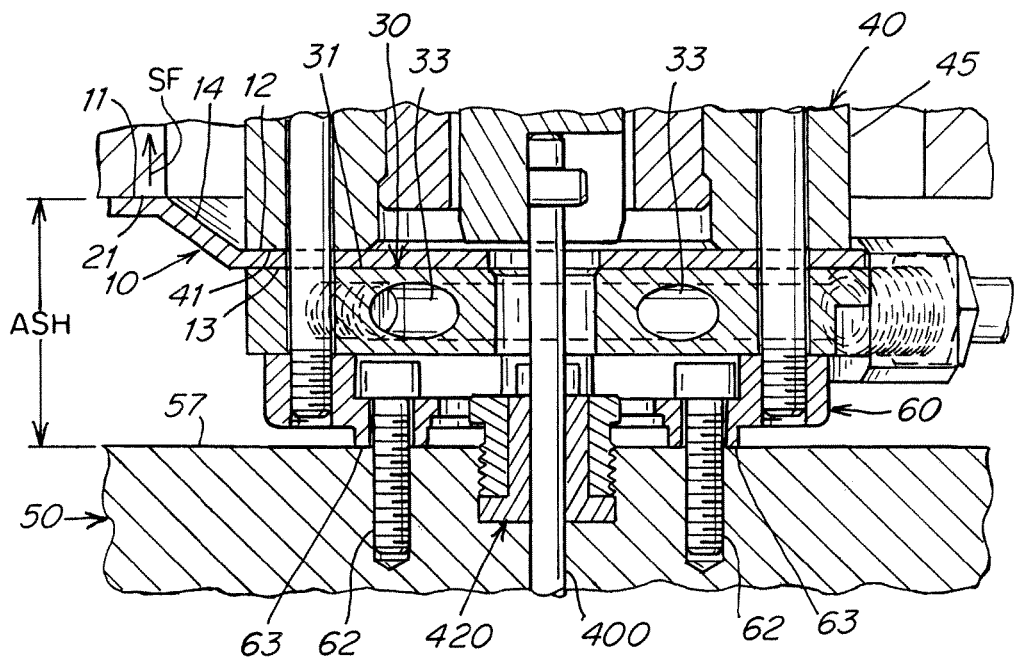
FIG. 4 is a fragmentary cross-sectional side view taken along line 4-4 of FIG. 3.
Figure 5:
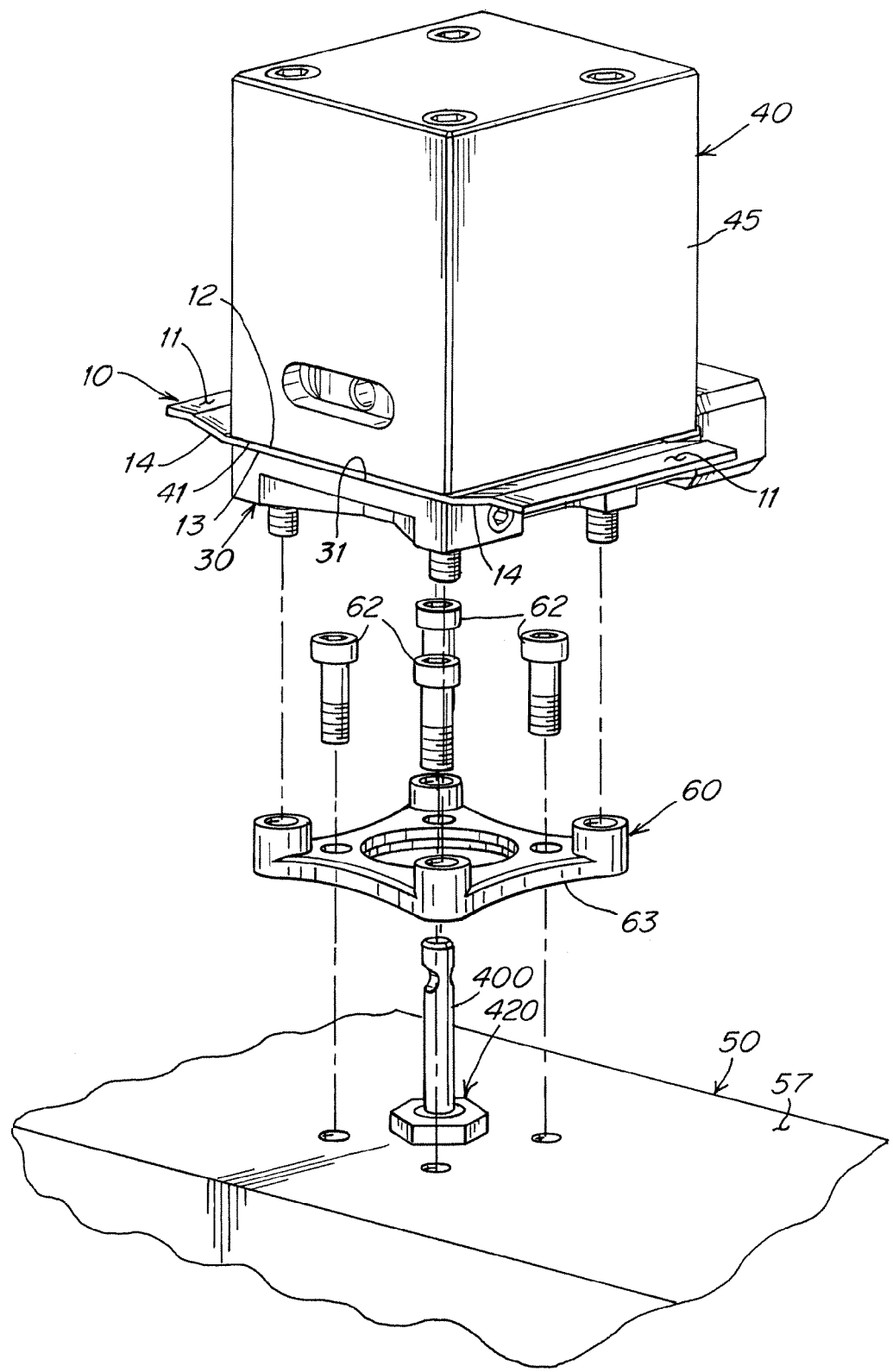
FIG. 5 is an exploded top perspective view of the actuator, actuator mount system and hotrunner of FIG. 2.
Figure 6:
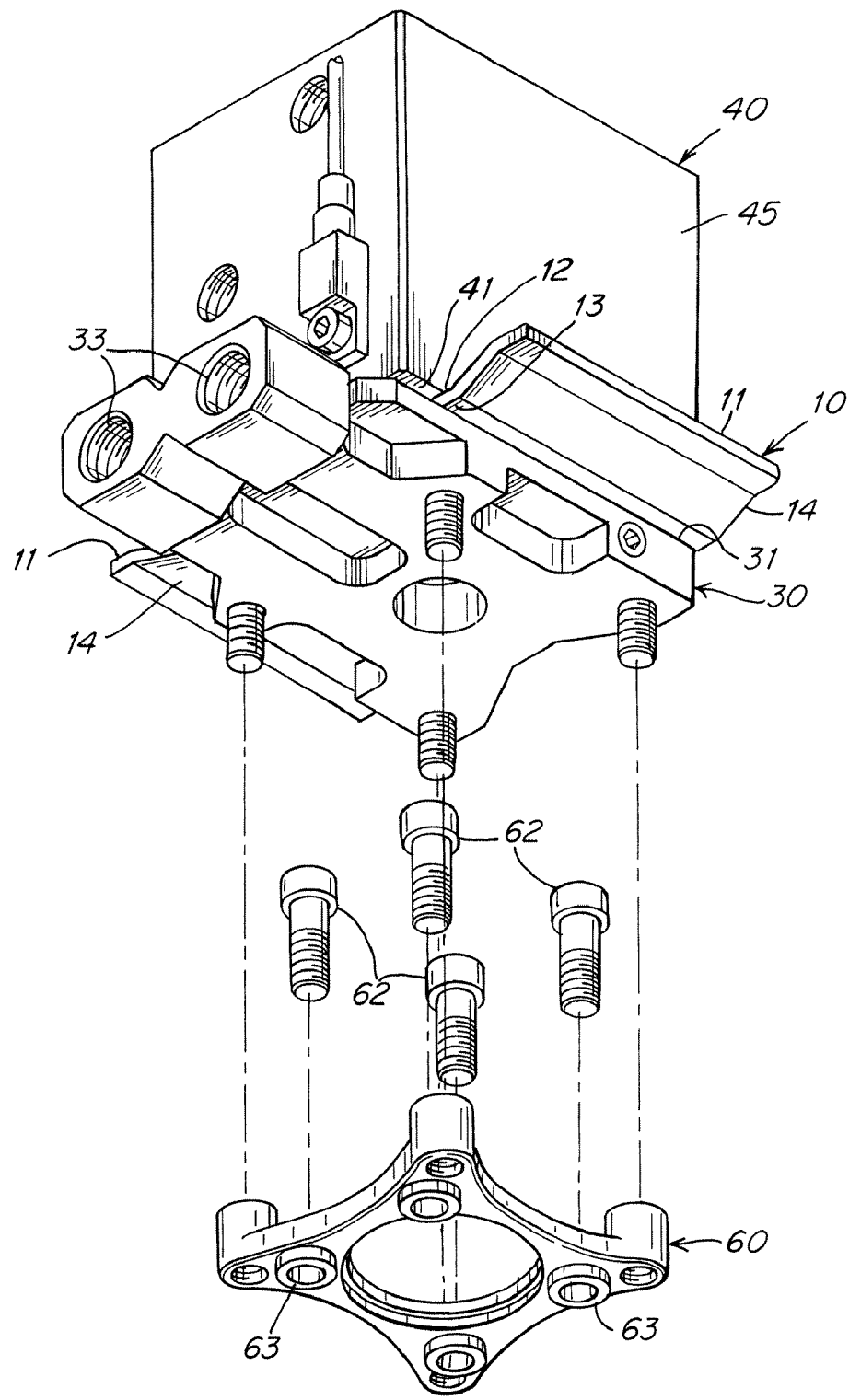
FIG. 6 is an exploded bottom perspective view of the system as shown in FIG. 2.
Figure 7:
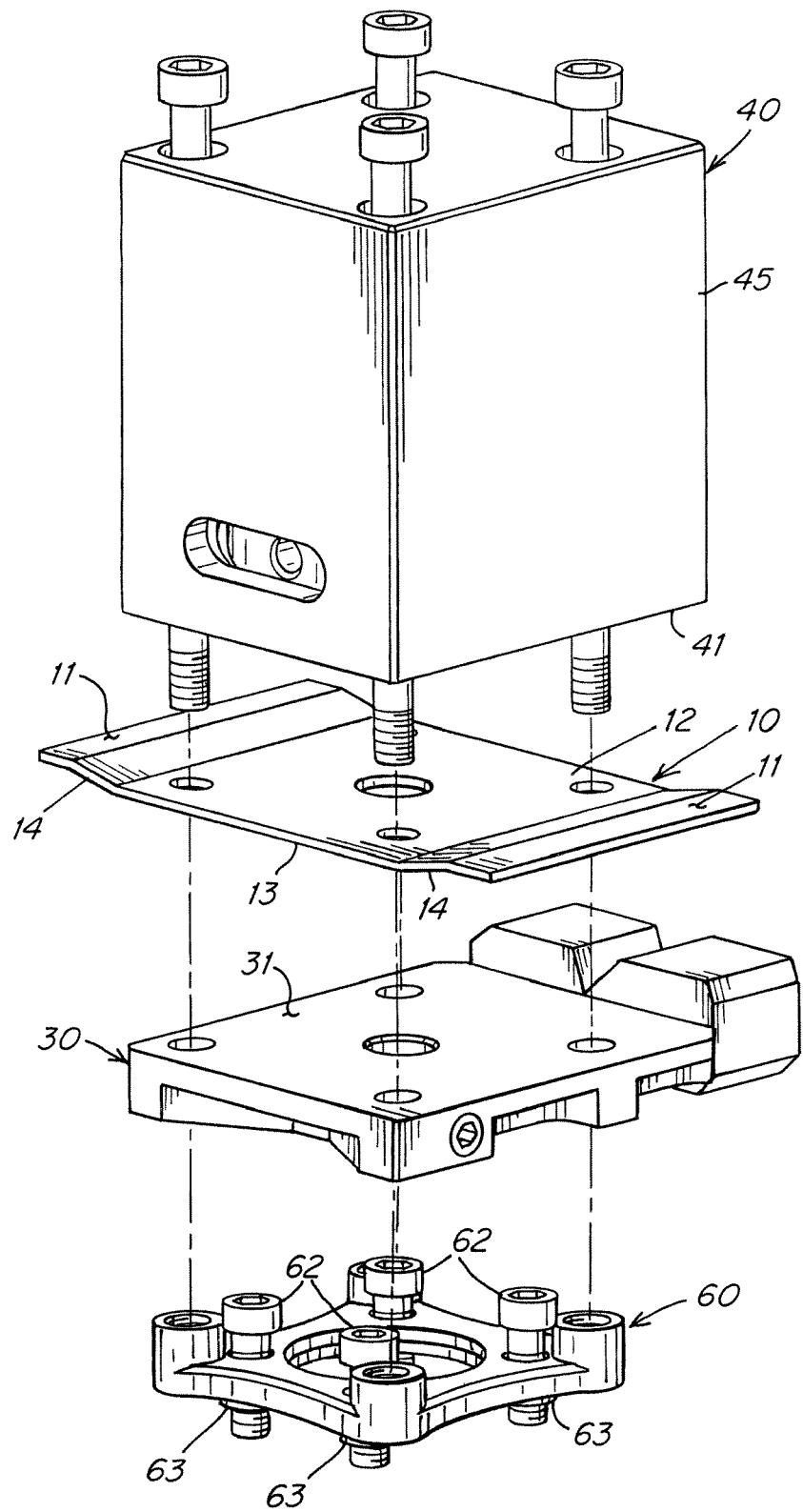
FIG. 7 is a further exploded top perspective view of the system as shown in FIG. 2.

As shown in FIGS. 1-3, the highly thermally conductive cooling mount 10 has lateral extensions or wings 14 that are configured and arranged to have an upper or upstream facing surface(s) 11 that make compressed contact with a lower surface 21 of the cooled clamp plate 20 thus enabling heat that may otherwise flow from the manifold 50 to/through the cooling block 30 and the plate 10 and the actuator 40 to be conductively transferred to the cooled clamp plate 20. Once the actuator 40 together with winged cooling plate 10 and in the position shown in FIGS. 1-9 on cooling device 30 and mount 60 onto surface 57, the rest of the system is assembled and arranged such that the clamp plate 20 is mounted a spaced distance S upstream of the heated manifold 50. The actuator 40 and its associated components plate 30 and mount 60 collectively have a mounting height AH extending upstream from the surface 57 of the heated manifold 50. The receiving cavity 20 of the clamp plate 20 has a receiving depth CH of sufficient size together with space S to accommodate receipt of the mounting height AH of the assembly of the actuator 40, plates 100, and cooling device 30.

Thus in the FIGS. 1-9 embodiment, some portion of the heat that is conducted to the body of the actuator 40 from the heated manifold 50 is re-routed or conducted to the wings 14 via heat conductive engagement of the surfaces 13 and 31. Such heat that is conducted to the wings 14 is in turn conducted to the clamp plate surface 21 via engagement with the spring-loaded heat conductive surface 11, the clamp plate 20 acting as a heat sink to help lower the temperature of the body 45 of the actuator 40.

As shown the system is adapted and arranged so that when assembled, the clamp plate 20 is thermally isolated from the heated manifold by an insulating air space S by which the clamp plate 20 is spaced apart from the upstream surface 57 of the manifold 50. Typically, the clamp plate 20 is maintained in such a thermally isolated position relative to the manifold 50, the clamp plate having little to no direct thermally conductive contact with the manifold 50 other than incidentally through a less than about 2 inch square area of contact that may exist between a spacer 48 and the clamp plate 20 and between the spacer 48 and the manifold 50, the spacer 48 being disposed between the clamp plate 20 and the manifold for purposes of ensuring proper positioning of the manifold 50 relative to the clamp plate 20. The clamp plate 20 is typically cooled with a cooling fluid pumped and flowing through cooling channels 25 in the body of the clamp plate 20. Thus, thermally conductive direct contact between the surfaces 11 and the clamp plate surface 21 enable heat to transfer from the body 45 of the actuator 40 to the clamp plate 20, the heat being readily dissipated by the cooled clamp plate 20.

The winged cooling plate 10 is comprised of a highly thermally conductive material. The cooling plate assembly 10, 30, 60 has an assembled height ASH when mounted to the manifold surface 57 that extends from the downstream-most mounting surface 63 of the mount 60 to the upstream facing engagement surface 11 of the wings 14 of the cooling plate 10, FIGS. 4-6. The length of the spacing distance S is predetermined relative to the assembled height ASH such that when the components of the system including the clamp plate 20 and manifold 50 are assembled and connected together with the mold 500, the upstream facing surfaces 11 of the wings 14 engage the downstream facing surface 21 of the clamp plate 20 under a selected amount of compression created by the downstream bending of wings 14 resulting in upward spring force SF being exerted by wings 14 urging surfaces 11 in an upstream direction into compressed engagement with surface 21 of cooled clamp plate 20. Thus the system is adapted to have an assembled configuration where on assembly together of the clamp plate 20, mold 500, manifold 50, actuator 40 and mount 10, the spring force in the wings 14 is loaded thus urging the surfaces 11 into thermally conductive compressed engagement with the surface 21.

The compressed contact between thermally conductive metal surfaces 11 and 21 enables heat flow between the bodies 10, 20 having the metal surfaces. The cooling device 30 is typically cooled to less than about 100 degrees Fahrenheit and is actively cooled by water injection flow during an injection cycle. When the injection molding machine 70 is shut down, all of the other components of the apparatus including the cooling device are also typically shut down causing the actuator 40 to be more prone and subject to being heated up by the manifold 50. The manifold 50 is very large in size and mass and thus takes a longer time to cool down on shutting the apparatus down. Thus immediately after shut down of the apparatus, the cooling block 30 is not proactively working to maintain the actuator 40 cool while the manifold 50 simultaneously remains at a very high temperature thus causing elevated heat transfer from the manifold 50 through the mount 60 and the block 30 to the actuator 40. The thermally conductive plate-mount 10 serves to divert the manifold heat via the wings 14 to the relatively cool clamp plate 20 which is itself a very large mass of material which is not easily heated up by the hot manifold on shut down. The thermally conductive mount 10 thus essentially cools the actuator 40 or at least works to minimize or lessen the amount of heat transfer from the manifold 50 to the actuator 40 without active cooling by the cooling device 30.

Figure 8:
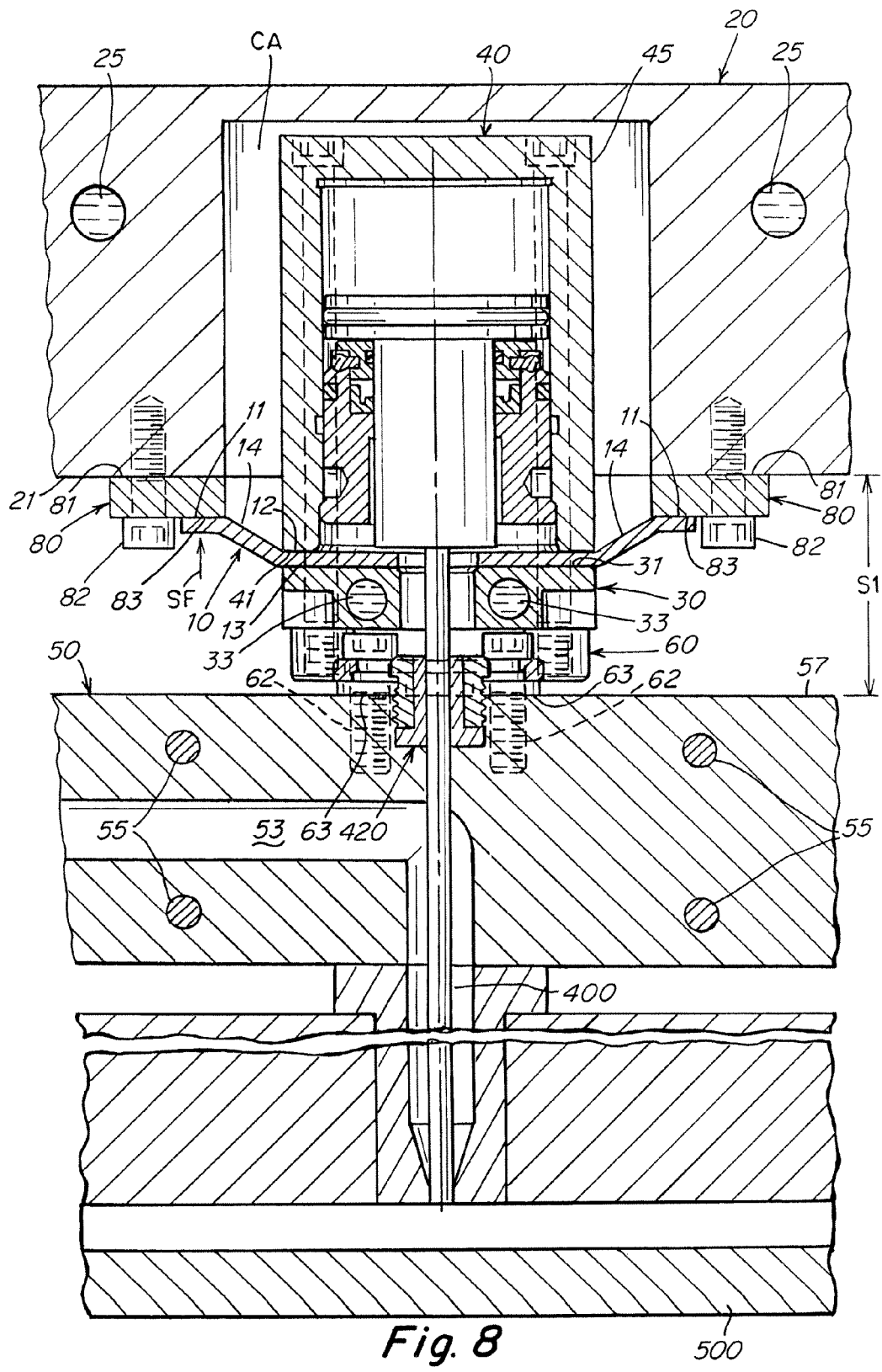
FIG. 8 is a cross-sectional side perspective view of an alternate embodiment of a system according to the invention employing spacer bars.
Figure 9:
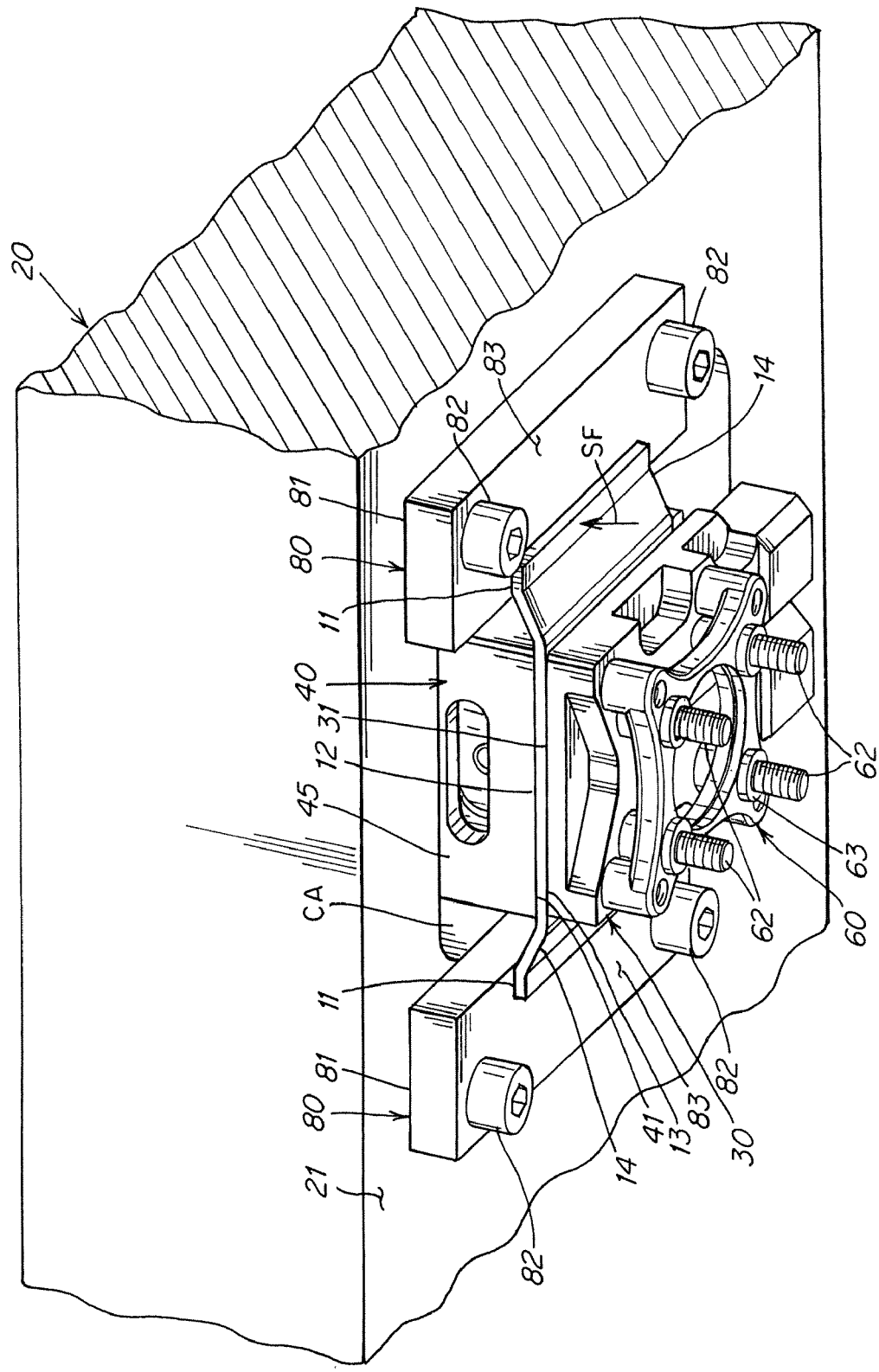
FIG. 9 is a bottom perspective view of the system as shown in FIG. 8.

In the embodiment shown in FIGS. 8, 9, a spacer 80 is compressibly connected to selected position on the downstream facing surface 21 of the clamp plate 20 such that the upstream facing surface 11 of the wings 14 engage a downstream facing surface 83 of the spacers 80 rather than directly to the clamp plate surface 21. The spacers 80 are comprised of a highly thermally conductive material so that heat conducts readily from the wings 14 to the spacers 80 and in turn from the spacers to the clamp plate body 20. The spacers 80 can be employed to increase the size of the insulating air space S1 or for otherwise accommodating thickness, height or other size variations in the components 10, 30, 60 or other components that may be employed to assemble and mount the cooling plate 10. As in the FIGS. 1-7 embodiment, the size, depth and height of the various components of the system shown in FIGS. 8, 9 are preselected such that when the components of the system are all assembled, in particular when the clamp plate 20 and manifold are mounted to the mold 500 and the spacers 48 and 80 are assembled and connected to the clamp plate 20, the upstream facing surfaces 11 of the wings 14 engage the downstream facing surface 83 of the spacers 80 under a selected amount of compression created by the downstream bending of wings 14 resulting in upward spring force SF being exerted by wings 14 urging surfaces 11 in an upstream direction into compressed engagement with surfaces 83 of spacers 80. As in other embodiments, the clamp plate 20 is preferably thermally isolated from the heated manifold 50.

Figure 10:
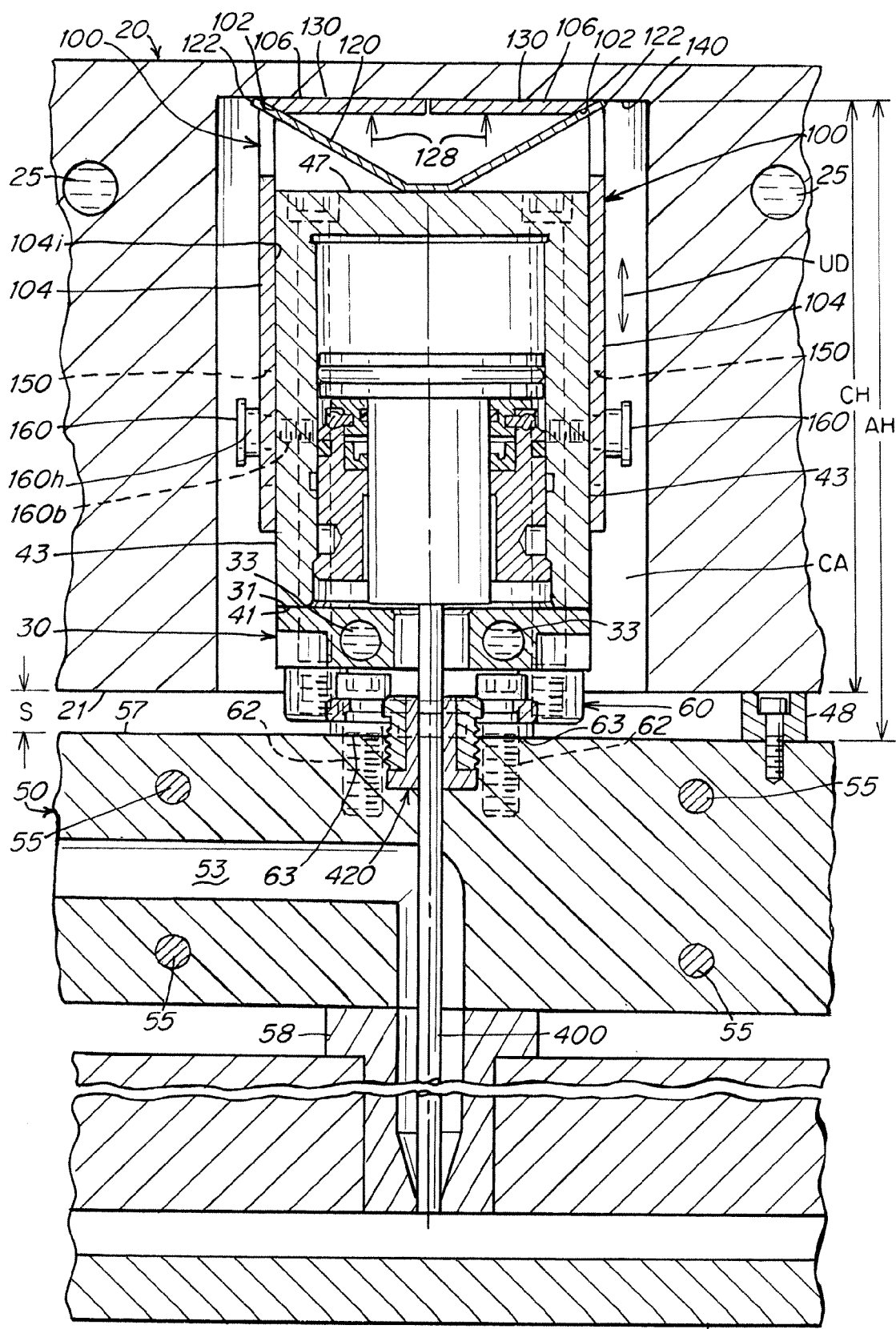
FIG. 10 is a cross-sectional side view an alternate embodiment of the invention having a heat transfer plate engaging an upper end of the actuator component.
Figure 11:
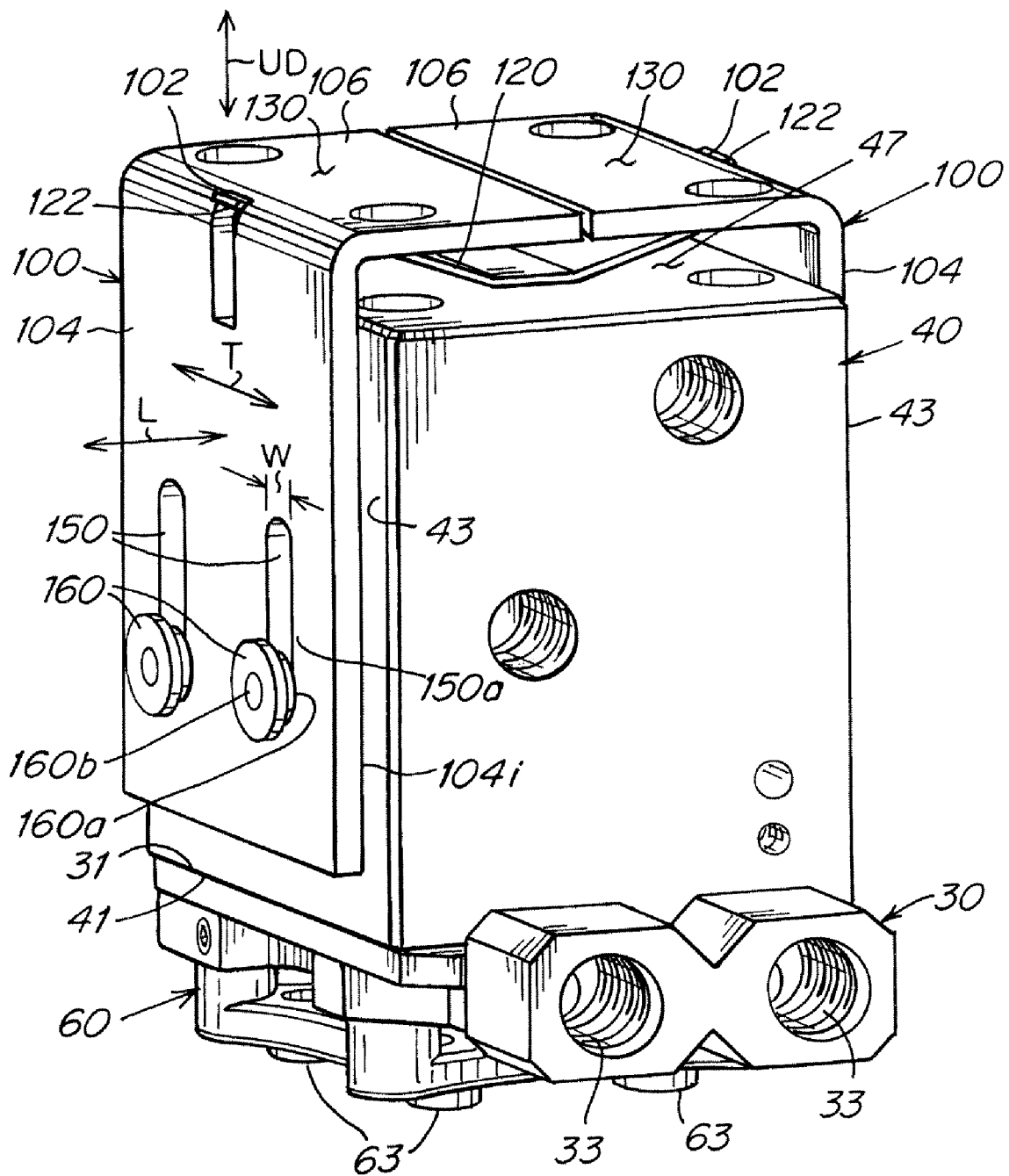
FIG. 11 is a top perspective view of the system as shown in FIG. 10.

In an alternative embodiment shown in FIGS. 10, 11, the actuator 40 is mounted to the manifold 50, separated from direct contact with the manifold 50 by the cooling device 30 and the mount 60 for the cooling device. The FIGS. 10, 11 apparatus has cooling or heat deflector plates 100 which are flanged as shown. The plates 100 have one or more slots 150 that slidably receive projections 160 from a sidewall 43 of the actuator 40 such that the plates 150 can be slid or moved in an upstream or downstream direction 180 relative to the actuator 40. The projections 160 comprise a bolt 160b that extends laterally through the slots 150, the bolts having a diameter that is complementary to the width W of the slots 150 so that the plate 100 is prevented from travelling in front to back direction T and is slidable in an up and down direction UD. The projections 160 preferably have a head portion 160h having a diameter that is wider than the width W of the slot 150, the head portion 160h having an inwardly facing surface 160a that engages the outwardly facing edge surfaces 150a of the slots 150 thus preventing the plates 100 from moving in a lateral direction L away from the outside lateral surface 43 of the body of the actuator 40. As shown, the bolts 160b are screwed and secured a selected distance into the depth of the body of the actuator 40 as shown in FIG. 10 so as to stably position the projections 160 and the head 160h and inwardly facing surface 160a relative to the the side edges 150a of the slots 150 such the inside surfaces 104i of the sides 104 of the plates 100 are held in engaged contact with the outside surface 43 of the actuator 40.

The inside surfaces 104i that are engaged with the outside surface 43 of the actuator are thus in heat conductive contact with the sidewall 43 or other outside surface of the actuator 40 as may alternatively be selected for engagement of the plates 100 therewith. As shown, the plates 100 have a top flanged portion 106 that extends and is disposed between a top end surface 47 of the actuator 40 and a downstream facing surface 140 of the top clamp plate 20. The top flanged portion 106 of the cooling or deflector plates 100 have a top or upstream facing surface 130 that is urged by spring force 128 of spring 120 into engagement and heat conductive contact with the downstream facing surface 140 of the top clamp plate. A plate or leaf spring 120 is disposed in engagement with the top surface 47 of the actuator 40. The leaf spring 120 is configured and arranged having a pair of laterally extending arms 120 having terminal ends 122 that engage with a pair of receiving or bearing surfaces 102 of the plate(s) 100.

As shown in FIGS. 10, 11, the ends 122 of the spring 120 engage with the plates at about the area of the bend in the plates 100 that forms the flange. When the arms 120 of the springs are compressed, the ends 122 of the arms exert an upstream directed spring force 128 against the plates 100 that urges the upstream facing surfaces 130 of the plates 100 into heat conductive engagement with the downstream facing surface 140 of the top clamp plate.

In such an alternative embodiment, heat that is conducted to the body of the actuator 40 from the heated manifold 50 is re-routed or conducted to the side portions 104 of the plates 100 via heat conductive engagement of the inside surfaces 104i of the sides 104 with the outside surfaces 43 of the actuator 40. Such heat that is conducted to the side portions 104 is in turn conducted to the top portions 106 which is in turn conducted to the body of the clamp plate 20 via the spring-loaded 128 heat conductive contact between the top surface 130 of the top portions 106 with the surface 140 of the top clamp plate 20.

As shown in FIGS. 10, 11, the body of the actuator 40 is mounted directly on and in heat conductive engagement with the cooling block 30. The actuator 40 in combination with the cooling plates 100 and cooling device is mounted and secured via bolts 62 onto the upstream facing surface 57 of the heated manifold 50. As shown the actuator 40 and associated components have a certain height AH that they extend upstream from the surface 57. Once the actuator 40 together with its accompanying plates 100 and spring 120 has been mounted in the position shown in FIGS. 10, 11 on cooling device 30 and surface 57, the rest of the system is assembled such that the clamp plate 20 is mounted a spaced distance S upstream of the heated manifold 50. The mounting height AH of the assembly of the actuator 40, plates 100, and cooling device 30 and the depth CH of the receiving aperture CA in the clamp plate 20 are preselected so that when the components of the system including the clamp plate 20 and manifold 50 are assembled and connected together with the mold 500, the upstream facing surface 130 of the plates 100 engage the downstream facing surface 140 of the clamp plate 20 under compression created by compression of springs 120 resulting in the spring force 128 urging surface 130 in an upstream direction into compressed engagement with surface 140.

When the system is assembled as described with the upstream surface 130 of the plates engaging the downstream surface 140 of the clamp plate under compression 128, the inside surfaces 104i of the plates 100 are free to slide upstream and downstream UD against the outside surface 43 of the actuator 40, the plates themselves being free to slide upstream and downstream UD to accommodate any changes in the distance AH that can or may occur as a result of expansion or contraction of the length, width or depth of the manifold 50, plates 30, 60 or 20 or the actuator body 40 or other components of the system when the assembled system is raised to elevated operating temperature or lowered from operating temperature to room temperature.

As shown in FIGS. 10, 11 the system is adapted and arranged so that when assembled, the clamp plate 20 is thermally isolated from the heated manifold by an insulating space S by which the clamp plate is spaced apart from the manifold. The insulating space S results from the pre-selection of the actuator height AH relative to the cavity height CH where the spring force 128 occurs on assembly of the clamp plate 20 together with the mold 500 and manifold 50. Typically, the clamp plate 20 is isolated from and mounted to either or both the mold 500 and manifold 50 such that the clamp plate 20 is maintained in a thermally isolated position relative to the manifold 50 spaced by S, the clamp plate having little to no direct thermally conductive contact with the manifold 50 other than incidentally through a less than about 2 inch square area of contact that may exist between a spacer 48 or other component and the clamp plate 20, the spacer 48 being in similar conductive contact with the manifold 50. The spacer 48 is disposed between the clamp plate 20 and the manifold 50 for purposes of ensuring the proper positioning of the manifold 50 relative to the clamp plate 20. The clamp plate 20 may alternatively be mounted to the mold 500 without conductive contact with the manifold 50 such that insulating space S is maintained.

The clamp plate 20 is typically cooled with a cooling fluid disposed and flowing through cooling channels 25 in the body of the clamp plate 20. Thus, thermally conductive direct contact between the slidable plates 100 and the clamp plate 20 enable heat to transfer from the body of the actuator 40 to the clamp plate, the heat being readily dissipated by the cooled clamp plate 20.

As shown in FIGS. 10, 11, the downstream facing surfaces 60a of a downstream mount 60 for the cooling device 30 are mounted in compressed contact with the top surface 57 of the manifold 50 when the system is fully assembled. The cooling block 30 is proactively cooled with water pumped through cooling channels 33 during active operation of the entire apparatus. During operation of the apparatus, the cooled cooling block 30 serves to maintain the actuator 40 cool and/or relatively insulated from the heated manifold 50. In the embodiment shown, the cooling block 30 is mounted on an intermediate mount 60 which itself is mounted in engagement contact with the body or upstream facing surface 57 of the heated manifold 50 via bolts 62. Heat from the heated manifold 50 is thus thermally conducted or transferred to the actuator 40 through the bolts 62, mount 60 and block 30.

In all embodiments of the invention, the mold 500 is preferably also thermally isolated from the manifold, there being on incidental contact between certain components such as an injection nozzle with both the manifold and the mold.

Further in all of the embodiments shown, a valve pin 400 is interconnected at an upstream end to a piston of the actuator 40. The valve pin 400 extends from the actuator 40 first into and through a fluid material feed bore 53 in the manifold 50 itself (as opposed to directly into the bore of the nozzle 58), the manifold bore 53 communicating with and feeding molten fluid material into the bore of the nozzle 58 that leads to and feeds into the cavity of the mold 500. The valve pin 400 is typically mounted to the manifold 50 such that the valve pin 400 moves laterally with the manifold 50 as the manifold expands on heating to operating temperature. As shown, the valve pin 400 is mounted to the manifold 50 via a bushing 420 or alternatively by extending through a complementary aperture (embodiment not shown) provided in the body of the manifold 50 itself that receives the valve pin 400.

What is claimed is:

1. In an injection molding apparatus comprising a clamp plate, a heated manifold and a mold, a system for mounting an actuator to the manifold and the clamp plate, the system comprising:

a mount comprised of a thermally conductive material having first and second heat conductive surfaces disposed between the clamp plate and the actuator, the actuator being mounted in thermal communication with the first conductive surface and the clamp plate being mounted in thermal communication with the second conductive surface and in substantial thermal isolation from the heated manifold;

the actuator being mounted to the manifold;

the second conductive surface of the mount being urged into contact with the clamp plate under a spring force exerted between the actuator and the mount;

the mount being adjustably mounted to the actuator such that the second conductive surface can be adjusted in position toward and away from the actuator;

a cooling device separating the actuator from contact with the manifold, the cooling device having a first mounting surface in thermally conductive communication with a mounting surface of the actuator and a second mounting surface in thermally conductive communication with a mounting surface of the manifold;

wherein the cooling device comprises a thermally conductive metal device that is cooled to a temperature less than about 150 degrees F.

2. The apparatus of claim 1 wherein the first conductive surface of the mount is adapted to be slidably engaged with an outside surface of the actuator, the second conductive surface of the mount being adjustable in distance toward and away from the actuator by sliding movement of the first conductive surface on the outside surface of the actuator.

3. The apparatus of claim 1 wherein the first conductive surface of the mount is maintained in compressed contact with the outside surface of the actuator.

4. The apparatus of claim 1 wherein the clamp plate is mounted in a position upstream from and in spaced thermal isolation from the manifold.

5. The apparatus of claim 1 wherein the clamp plate is cooled.

6. The apparatus of claim 1 wherein the mount includes a spring disposed between a body surface of the actuator and the mount, the clamp plate, the mold, the manifold, the actuator and the mount being assembled together in an arrangement wherein the spring is compressed urging the second conductive surface of the mount into compressed engagement with the clamp plate.

7. The apparatus of claim 1 wherein the actuator is connected to a valve pin mounted to and extending through a fluid material feed bore in the manifold.

8. In an injection molding apparatus comprising a clamp plate, a heated manifold and a mold, a system for mounting an actuator to the manifold and the clamp plate, the system comprising:
- a mount comprised of a thermally conductive material having first and second heat conductive surfaces disposed between the clamp plate and the actuator, the actuator being mounted in thermal communication with the first conductive surface and the clamp plate being in mounted in thermal communication with the second conductive surface;
- the actuator being mounted in thermal communication with the manifold;
- the mount being adjustably mounted to the actuator such that the second conductive surface can be adjusted in position toward and away from the actuator;
- the mount including a spring disposed between a body surface of the actuator and the mount, the clamp plate, the mold, the manifold, the actuator and the mount being assembled together in an arrangement wherein the spring is loaded urging the second conductive surface of the mount into compressed engagement with the clamp plate.

9. The apparatus of claim 8 further comprising a cooling device separating the actuator from contact with the manifold, the cooling device having a first mounting surface in thermally conductive communication with a mounting surface of the actuator and a second mounting surface in thermally conductive communication with a mounting surface of the manifold.

10. The apparatus of claim 9 wherein the cooling device comprises a thermally conductive metal device that is cooled to a temperature less than about 150 degrees F.

11. The apparatus of claim 8 wherein the first conductive surface of the mount is adapted to be slidably engaged with an outside surface of the actuator, the second conductive surface of the mount being adjustable in distance toward and away from the actuator by sliding movement of the first conductive surface on the outside surface of the actuator.

12. The apparatus of claim 8 wherein the first conductive surface of the mount is maintained in compressed contact with the outside surface of the actuator.

13. The apparatus of claim 8 wherein the clamp plate is mounted in a position upstream from and in spaced thermal isolation from the manifold.

14. The apparatus of claim 8 wherein the clamp plate is cooled.

15. The apparatus of claim 8 wherein the mount includes a spring disposed between a body surface of the actuator and the mount, the clamp plate, the mold, the manifold, the actuator and the mount being assembled together in an arrangement wherein the spring is compressed urging the second conductive surface of the mount into compressed engagement with the clamp plate.

16. The apparatus of claim 8 wherein the actuator is connected to a valve pin mounted to and extending through a fluid material feed bore in the manifold.

17. In an injection molding apparatus comprising a clamp plate, a heated manifold and a mold, a system for mounting an actuator to the manifold and the clamp plate, the system comprising:
- a mount comprised of a thermally conductive material having first and second heat conductive surfaces disposed between the clamp plate and the actuator, the actuator being mounted in thermal communication with the first conductive surface and the clamp plate being mounted in thermal communication with the second conductive surface and in substantial thermal isolation from the heated manifold;
- the actuator being mounted to the manifold;
- the second conductive surface of the mount being urged into contact with the clamp plate under a spring force exerted between the actuator and the mount;
- the mount being adjustably mounted to the actuator such that the second conductive surface can be adjusted in position toward and away from the actuator; and,
- wherein the clamp plate is cooled.

18. In an injection molding apparatus comprising a clamp plate, a heated manifold and a mold, a system for mounting an actuator to the manifold and the clamp plate, the system comprising:
- a mount comprised of a thermally conductive material having first and second heat conductive surfaces disposed between the clamp plate and the actuator, the actuator being mounted in thermal communication with the first conductive surface and the clamp plate being mounted in thermal communication with the second conductive surface and in substantial thermal isolation from the heated manifold;
- the actuator being mounted to the manifold;
- the second conductive surface of the mount being urged into contact with the clamp plate under a spring force exerted between the actuator and the mount;
- the mount including a spring disposed between a body surface of the actuator and the mount, the clamp plate, the mold, the manifold, the actuator and the mount being assembled together in an arrangement wherein the spring is loaded urging the second conductive surface of the mount into compressed engagement with the clamp plate; and,
- wherein the clamp plate is cooled.

19. A method of mounting an actuator that drives a valve pin in an injection molding system comprising a manifold, a mold and a clamp plate, the method comprising:
- mounting the clamp plate to the mold in thermal isolation from the manifold;
- cooling the clamp plate;
- mounting the actuator in thermal communication with the manifold;
- heating the manifold;
- forming a heat transfer mount having a spring, a first conductive surface and a second conductive surface;
- assembling the clamp plate, the manifold, the actuator and the mold together such that the first conductive surface of the heat conductive mount is disposed in contact with a heat conductive surface of the actuator, the second conductive surface of the heat conductive mount is disposed in heat conductive contact with the clamp plate and the spring is disposed between a body surface of the actuator and the mount and the spring is compressed to urge the second conductive surface of the mount into thermally conductive contact with the clamp plate.

20. The method of claim 19 further comprising mounting the heat transfer mount to the heat conductive surface of the actuator such that the first conductive surface of the heat transfer mount is maintained in sliding heat conductive contact with the heat conductive surface of the actuator.

21. The method of claim 19 further comprising disposing a cooled plate between the actuator and the manifold in thermally conductive communication therewith.

22. The method of claim 19 further comprising driving the valve pin through a fluid feed bore within the manifold.

* * * * *